US008760651B2

(12) United States Patent
Kato et al.

(10) Patent No.: US 8,760,651 B2

(45) Date of Patent: Jun. 24, 2014

(54) SMOKE DETECTOR

(75) Inventors: Kenichi Kato, Tokyo (JP); Takashi Ito, Tokyo (JP)

(73) Assignee: Nohmi Bosai Ltd., Tokyo (JP)

( * ) Notice: Subject to any disclaimer, the term of this patent is extended or adjusted under 35 U.S.C. 154(b) by 40 days.

(21) Appl. No.: 13/610,088

(22) Filed: Sep. 11, 2012

(65) Prior Publication Data

US 2013/0258335 A1 Oct. 3, 2013

(30) Foreign Application Priority Data

Mar. 30, 2012 (JP) ................................ 2012-080508

(51) Int. Cl.
*G01N 21/00* (2006.01)

(52) U.S. Cl.
USPC ............................ 356/338; 356/337; 356/343

(58) Field of Classification Search
USPC ................................................ 356/337–343
See application file for complete search history.

(56) References Cited

U.S. PATENT DOCUMENTS 7,167,099 B2 * 1/2007 Kadwell et al. ............... 356/338

* cited by examiner

*Primary Examiner* — Gregory J Toatley
*Assistant Examiner* — Iyabo Alli
(74) *Attorney, Agent, or Firm* — Wenderoth, Lind & Ponack, LLP

(57) ABSTRACT

A smoke detector (1) includes: a light emitting section (6); a light receiving section (7); a smoke detecting section (12), the smoke detector (1) being configured to detect smoke or the like in a manner that the light receiving section (7) receives, via a light transmissive member (11), scattered light generated when light emitted from the light emitting section (6) is scattered in the smoke detecting section (12) due to particles of the smoke or the like; and a test light source (22) provided for detecting light receiving sensitivity of the light receiving section. The smoke detector (1) is further configured to detect a reduction in the light receiving sensitivity of the light receiving section (7) through detection of an increase in received light intensity of test light, which is emitted from the test light source (22) and is received by the light receiving section (7).

4 Claims, 6 Drawing Sheets

SMOKE DETECTOR

BACKGROUND OF THE INVENTION

1. Field of the Invention

The present invention relates to a smoke detector capable of optically detecting smoke and contaminants floating in the air.

2. Description of the Related Art

Conventionally, there has been used a smoke detector for detecting smoke so as to prevent and identify a fire, or for detecting contaminants (dust or the like) so as to preserve an environment in a semiconductor manufacturing plant, a food factory, or the like (so-called clean room or the like).

Among various smoke detectors, there is an optical smoke detector for optically detecting smoke and contaminants contained in the air (hereinafter referred to as "smoke or the like").

The optical smoke detector generally detects smoke or the like in a manner that a light receiving section receives scattered light generated in a smoke detecting section when light emitted from a light emitting section is scattered due to particles of the smoke or the like. However, light receiving sensitivity of the light receiving section may be reduced due to contamination or the like. In view of the above, as described in, for example, Japanese Patent Application Laid-open No. Hei 7-151680 (hereinafter referred to as "Patent Literature 1"), a test light emitting section for emitting test light is provided separately, and received light intensity of the test light at the light receiving section is measured, to thereby correct the light receiving sensitivity of the light receiving section based on the light intensity thus measured, and to output an alarm indicating abnormality when the light intensity becomes equal to or lower than a predetermined value (see paragraphs and in the specification and FIG. 23 of Patent Literature 1).

However, as in the case of the above-mentioned smoke detector described in Patent Literature 1, in a case of detecting the reduction in light receiving sensitivity of the light receiving section based on decrease in received light intensity at the light receiving section, the reduction in light receiving sensitivity is detected by measuring an amount of decrease from the normal received light intensity. Accordingly, the reduction in light receiving sensitivity is detected based on the decreasing received light intensity of the test light having much higher light intensity than the scattered light. Consequently, there arises a problem in that the reduction in light receiving sensitivity cannot be detected with high accuracy.

Further, in the case of the above-mentioned smoke detector described in Patent Literature 1, the test light having much higher light intensity than the scattered light is caused to enter a light receiving element at the front thereof (see paragraph of Patent Literature 1). Even when the contamination or the like in the light receiving section is so serious as to hinder the entrance of the scattered light, the entrance of the test light may be less affected by the contamination or the like. To avoid this situation, a strict threshold value may be set at the time of the test, but as a result, the course of the contamination or the like cannot be monitored.

SUMMARY OF THE INVENTION

The present invention has been made in view of the above-mentioned circumstances, and it is therefore an object thereof to provide a smoke detector capable of detecting reduction in light receiving sensitivity of a light receiving section with high accuracy.

According to an exemplary embodiment of the present invention, there is provided a smoke detector, including: a light emitting section; a light receiving section; a smoke detecting section, the smoke detector being configured to detect smoke or the like in a manner that the light receiving section receives, via a light transmissive member, scattered light generated when light emitted from the light emitting section is scattered in the smoke detecting section due to particles of the smoke or the like; and a test light source provided for detecting light receiving sensitivity of the light receiving section, the smoke detector being further configured to detect reduction in the light receiving sensitivity of the light receiving section through detection of increase in received light intensity of test light, which is emitted from the test light source and is received by the light receiving section.

Further, according to an exemplary embodiment of the present invention, there is provided a smoke detector in which the light receiving section receives scattered light generated when the test light, which is emitted from the test light source and enters the light transmissive member, is scattered in a case where abnormality such as contamination occurs in the light transmissive member.

Further, according to an exemplary embodiment of the present invention, there is provided a smoke detector in which the test light source is provided at a position at which the test light emitted from the test light source enters the light transmissive member, the position being situated outside a field-of-view range of the light receiving section.

Further, according to an exemplary embodiment of the present invention, there is provided a smoke detector in which the test light source is provided at a position at which the test light emitted from the test light source enters the light transmissive member, the position being situated outside an inner range defined within a field-of-view range of the light receiving section, the inner range being defined so that received light intensity of the test light, which is emitted from the test light source and is received by the light receiving section in a case where the abnormality such as the contamination does not occur in the light transmissive member, becomes equal to or larger than a sum of received light intensity of the test light, which is emitted from the test light source and is received by the light receiving section in a state of non-scattered light in the case where the abnormality such as the contamination occurs in the light transmissive member, and received light intensity of the test light, which is emitted from the test light source and is received by the light receiving section in a state of the scattered light in the case where the abnormality such as the contamination occurs in the light transmissive member.

Further, according to an exemplary embodiment of the present invention, there is provided a smoke detector in which the test light source is provided at a position at which the test light emitted from the test light source enters the light transmissive member, the position being situated outside an inner range defined within a field-of-view range of the light receiving section, the inner range being defined so that the following relational expression is established:

$$A0 \geq A1 + B1,$$

where "A0" represents received light intensity of the test light, which is emitted from the test light source and is received by the light receiving section in a case where the abnormality such as the contamination does not occur in the light transmissive member, "A1" represents received light intensity of the test light, which is emitted from the test light source and is received by the light receiving section in a state of non-scattered light in the case where the abnormality such as the contamination occurs in the light transmissive member, and "B1" represents received light intensity of the test light, which is emitted from the test light source and is received by the light receiving section in a state of the scattered light in the case where the abnormality such as the contamination occurs in the light transmissive member.

Further, according to an exemplary embodiment of the present invention, there is provided a smoke detector in which the test light emitted from the test light source enters the light transmissive member after being reflected on a reflection surface.

Note that, the present invention may have the following configurations.

That is, the light transmissive member may be a condenser lens for condensing light toward the light receiving section. The test light source may be an LED. The test light emitted from the test light source may enter the light transmissive member directly or indirectly. The test light emitted from the test light source may enter the light transmissive member after being reflected on a reflection surface. In this case, the reflection surface for reflecting the test light emitted from the test light source may be a wall surface of a light trap for attenuating, in the form of stray light, the light emitted from the light emitting section. The light receiving section may include a photodiode as a light receiving element. The test light source may be provided on the light receiving element side with respect to the light transmissive member. A threshold value for a test may be set so as to determine whether or not the light receiving sensitivity of the light receiving section is reduced. Strength of a signal of light, which is derived from the test light and received by the light receiving section, the signal being output from the light receiving section, is compared to the threshold value for the test. When the strength is equal to or higher than the threshold value for the test, it is determined that the light receiving sensitivity of the light receiving section is reduced. The threshold value for the test may include a plurality of threshold values which are set in a stepwise manner. Accordingly, it is possible to determine, in a stepwise manner, whether or not the light receiving sensitivity of the light receiving section is reduced. The threshold value for the test may be set with reference to strength of a signal output from the light receiving section in a normal case where the light receiving sensitivity of the light receiving section is not reduced.

According to the present invention, the test light source provided for detecting the light receiving sensitivity of the light receiving section is further provided, and at the time of the test, the smoke detector detects the reduction in light receiving sensitivity of the light receiving section through the detection of the increase in received light intensity of the test light, which is emitted from the test light source and is received by the light receiving section. Thus, it can be determined whether or not the light receiving sensitivity of the light receiving section is reduced based on the increasing received light intensity at the light receiving section.

Thus, according to the present invention, it is possible to provide the smoke detector capable of detecting the reduction in light receiving sensitivity of the light receiving section with high accuracy.

Further, according to the present invention, in the case where abnormality such as contamination occurs in the light transmissive member, the light receiving section receives the scattered light generated due to the abnormality. Thus, the abnormality such as the contamination can be detected based on the increase in received light intensity.

Further, according to the present invention, the test light source is provided at the position at which the test light emitted from the test light source enters the light transmissive member, the position being situated outside the field-of-view range of the light receiving section. Accordingly, at the time of the test, in the case where the contamination or the like does not occur in the light transmissive member and therefore the light receiving sensitivity of the light receiving section is not reduced, the test light emitted from the test light source is hardly received by the light receiving section. On the other hand, in the case where the contamination or the like occurs in the light transmissive member and therefore the light receiving sensitivity of the light receiving section is reduced, the light receiving section receives the scattered light generated when the test light, which is emitted from the test light source and enters the light transmissive member, is scattered due to the abnormality such as the contamination. Thus, it can be determined whether or not the light receiving sensitivity of the light receiving section is reduced based on the received light intensity at the light receiving section, which increases between the case where the abnormality such as the contamination does not occur in the light transmissive member and the case where the abnormality such as the contamination occurs in the light transmissive member.

Moreover, according to the present invention, the test light source is provided at the position at which the test light emitted from the test light source enters the light transmissive member, the position being situated outside the inner range defined within the field-of-view range of the light receiving section, the inner range being defined so that the received light intensity of the test light, which is emitted from the test light source and is received by the light receiving section in the case where the abnormality such as the contamination does not occur in the light transmissive member, becomes equal to or larger than the sum of the received light intensity of the test light, which is emitted from the test light source and is received by the light receiving section in the state of the non-scattered light in the case where the abnormality such as the contamination occurs in the light transmissive member, and the received light intensity of the test light, which is emitted from the test light source and is received by the light receiving section in the state of the scattered light in the case where the abnormality such as the contamination occurs in the light transmissive member. Alternatively, the test light source is provided at the position at which the test light emitted from the test light source enters the light transmissive member, the position being situated outside the inner range defined within the field-of-view range of the light receiving section, the inner range being defined so that the following relational expression is established:

$$A0 \geq A1 + B1,$$

where "A0" represents the received light intensity of the test light, which is emitted from the test light source and is received by the light receiving section in the case where the abnormality such as the contamination does not occur in the light transmissive member, "A1" represents the received light intensity of the test light, which is emitted from the test light source and is received by the light receiving section in the state of the non-scattered light in the case where the abnormality such as the contamination occurs in the light transmissive member, and "B1" represents the received light intensity of the test light, which is emitted from the test light source and is received by the light receiving section in the state of the scattered light in the case where the abnormality such as the contamination occurs in the light transmissive member. Thus, the received light intensity of the test light, which is emitted from the test light source and is received by the light receiving section in the case where the contamination or the like occurs in the light transmissive member and therefore the light receiving sensitivity of the light receiving section is reduced, can be set higher than the received light intensity of the test light, which is emitted from the test light source and is received by the light receiving section in the case where the contamination or the like does not occur in the light transmissive member and therefore the light receiving sensitivity of the light receiving section is not reduced. Also with this configuration, it can be determined whether or not the light receiving sensitivity of the light receiving section is reduced based on the received light intensity at the light receiving section, which increases between the case where the abnormality such as the contamination does not occur in the light transmissive member and the case where the abnormality such as the contamination occurs in the light transmissive member.

DETAILED DESCRIPTION OF THE PREFERRED EMBODIMENTS (First Embodiment)

Figure 1:
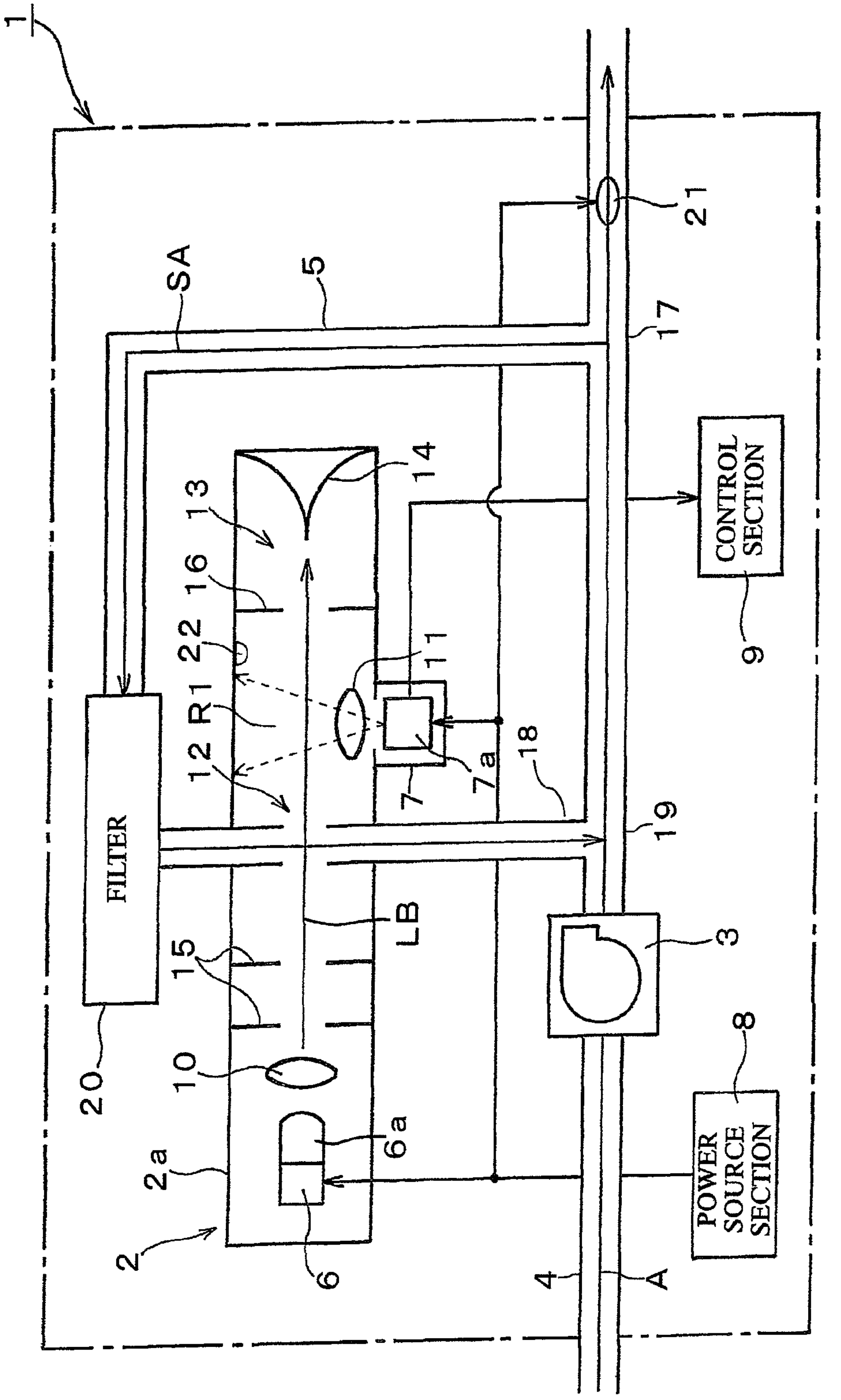
FIG. 1 is a configuration diagram illustrating an overview of a device configuration according to a first embodiment of the present invention.
Figure 2:
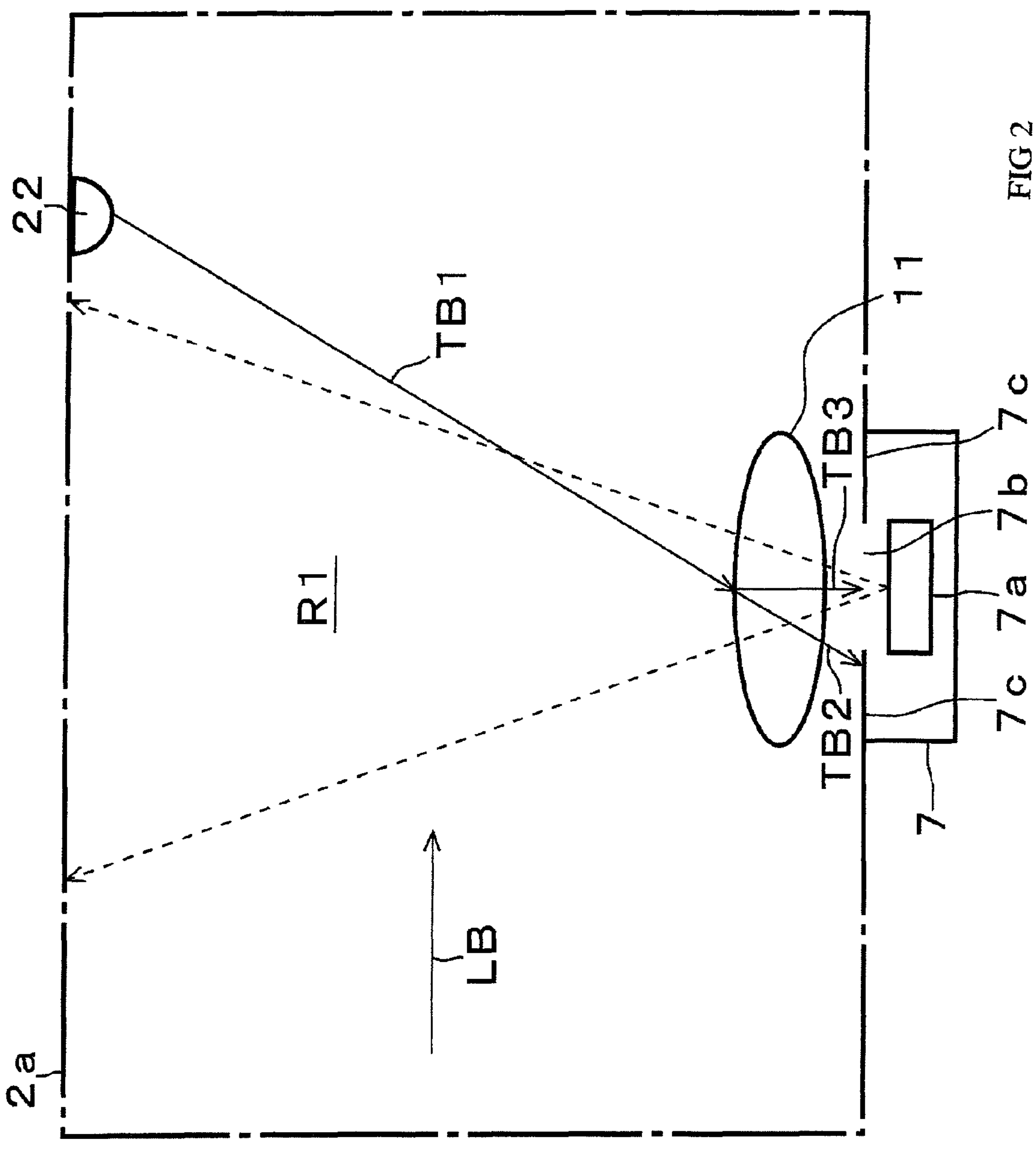
FIG. 2 is an explanatory diagram illustrating paths of test light and the like according to the first embodiment of the present invention.
Figure 3:
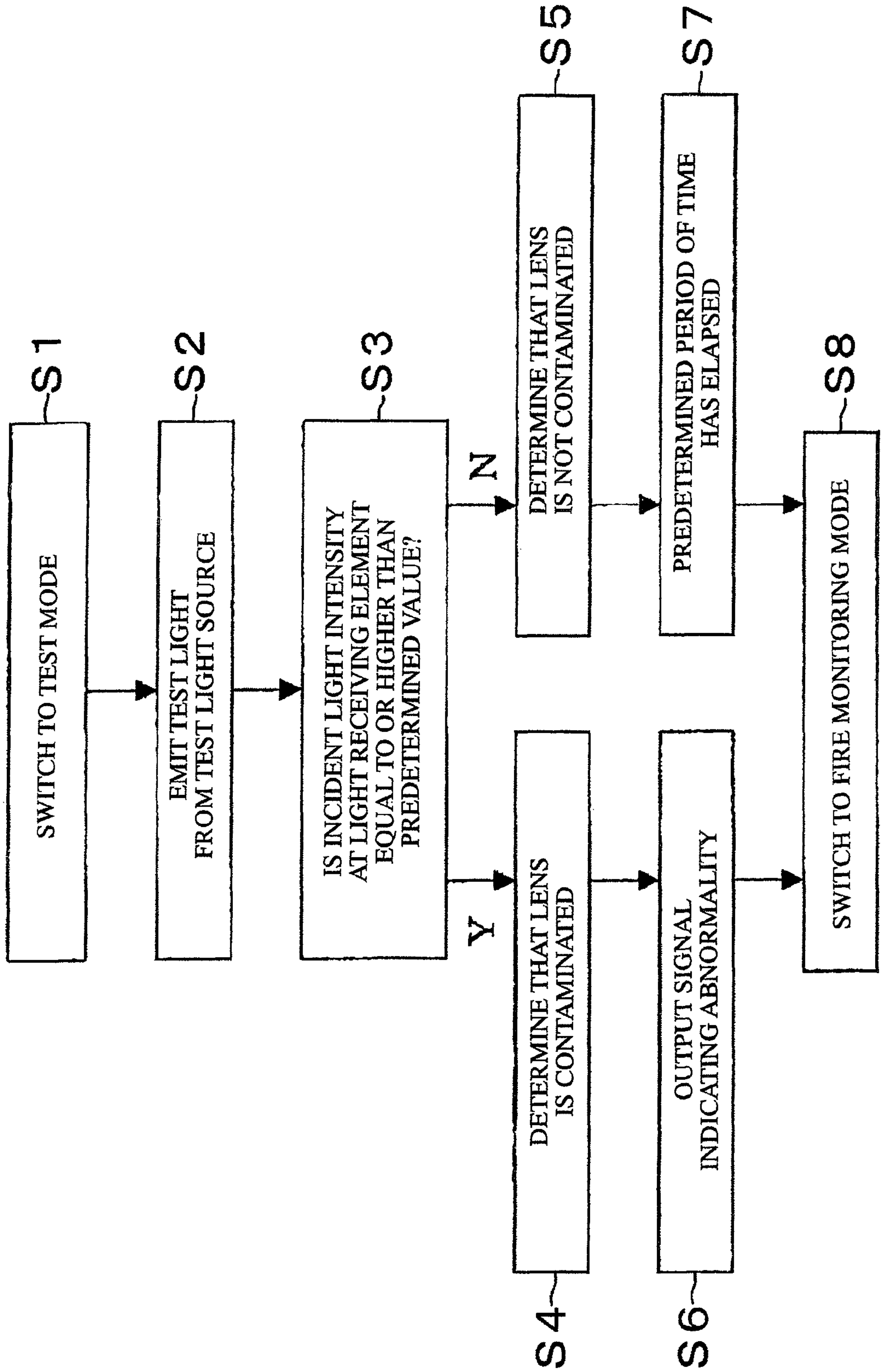
FIG. 3 is a flow chart illustrating a flow of processing at the time of testing light receiving sensitivity according to the first embodiment of the present invention.

First, referring to FIGS. 1 to 3, a smoke detector 1 according to a first embodiment of the present invention is described. Note that, the smoke detector 1 may be used for detecting smoke so as to prevent and identify a fire, or for detecting contaminants (dust or the like) so as to preserve an environment in a semiconductor manufacturing plant, a food factory, or the like (so-called clean room or the like).

As illustrated in FIG. 1, the smoke detector 1 includes a smoke detecting unit 2 defined by a dark box 2*a*, and a fan 3 for feeding air A, which serves as sampling air SA to be detected, to the smoke detecting unit 2 via an introduction passage 5. The air A flows into the smoke detector 1 via an inlet section 4 through a sampling pipe (not shown) that is laid in a monitoring zone. Further, the smoke detector 1 includes, in the smoke detecting unit 2, a light emitting section 6 including a light emitting element 6*a* such as an LED, and a light receiving section 7 including a light receiving element 7*a* such as a photodiode and arranged so that light LB emitted from the light emitting section 6 does not directly enter the light receiving element 7*a*. Still further, the smoke detector 1 includes a power source section 8 connected to the light emitting element 6*a* of the light emitting section 6, the light receiving element 7*a* of the light receiving section 7, an air flow sensor 21, and the like, and a control section 9 connected to the light receiving element 7*a* of the light receiving section 7 and the like.

Note that, in the smoke detector 1 of this embodiment, the introduction passage 5 is branched at a flow path branching section 17 on a secondary side of the fan 3, and a reflux path 18 for causing reflux of the sampling air SA from the smoke detecting unit 2 is joined at a flow path joining section 19 on the secondary side of the fan 3. Due to a pressure difference generated between the flow path joining section 19 and the flow path branching section 17 (the pressure difference may be generated therebetween by setting a flow rate at the flow path joining section 19 higher than a flow rate at the flow path branching section 17; for example, the pressure difference may be generated therebetween by providing the flow path joining section 19 at a position closer to a periphery of rotor blades of the fan 3, and providing the flow path branching section 17 at a position farther from the periphery of the rotor blades of the fan 3), the sampling air SA is caused to pass through the smoke detecting unit 2 from the introduction passage 5 while being filtrated with use of a filter 20, and to reflux toward the secondary side of the fan 3 through the reflux path 18.

The smoke detector 1 further includes a smoke detecting section 12 provided at a center of the dark box 2*a* of the smoke detecting unit 2. When the sampling air SA passes through the smoke detecting section 12, smoke or the like is detected optically.

Specifically, in a case where smoke or the like is contained in the sampling air SA, when the sampling air SA passes through the smoke detecting section 12, the light LB emitted from the light emitting element 6*a* of the light emitting section 6 is scattered due to the smoke or the like so that scattered light is generated. The scattered light thus generated is received by the light receiving element 7*a* of the light receiving section 7. In this manner, the smoke detector 1 detects the smoke or the like.

Note that, the smoke detecting unit 2 includes, in the dark box 2*a:* a condenser lens 10 situated in front of (specifically, immediately in front of) the light emitting section 6, for condensing the light LB emitted from the light emitting element 6*a* of the light emitting section 6, and for causing the condensed light LB to pass therethrough toward the smoke detecting section 12; a condenser lens 11 as an example of a light transmissive member situated in front of (specifically, immediately in front of) the light receiving section 7, for condensing the scattered light or the like, which is generated when the light LB emitted from the light emitting element 6*a* of the light emitting section 6 is scattered due to the smoke or the like, and for causing the condensed light LB to pass therethrough toward the light receiving section 7; apertures 15 and 16 through which the light LB emitted from the light emitting element 6*a* of the light emitting section 6 passes; and a light shielding section 13 including a light trap 14 for attenuating, in the form of stray light, the light LB emitted from the light emitting element 6*a* of the light emitting section 6.

In the smoke detector 1, the control section 9 includes an amplifier circuit for amplifying a signal output from the light receiving element 7*a* of the light receiving section 7, an A/D converter for converting the amplified signal, and a comparator circuit for comparing the converted signal with a preset threshold value. For example, the control section 9 is capable of detecting smoke or the like through determination based on the signal output from the light receiving element 7*a* of the light receiving section 7. As described later in detail, at the time of a test, the control section 9 is further capable of controlling ON/OFF of a test light source 22, detecting reduction in light receiving sensitivity of the light receiving element 7*a* of the light receiving section 7 through determination based on the signal output from the light receiving element 7*a* of the light receiving section 7, and controlling output of a signal indicating abnormality in the light receiving sensitivity in a case of detecting the reduction in light receiving sensitivity of the light receiving element 7*a* of the light receiving section 7.

In the dark box 2*a* of the smoke detecting unit 2 of the smoke detector 1, the test light source 22 such as an LED, which is provided for detecting the reduction in light receiving sensitivity of the light receiving section 7, is provided at a position at which test light emitted from the test light source 22 enters the condenser lens 11 as an example of the light transmissive member, the position being situated outside a field-of-view range R1 (range defined by the broken lines) of the light receiving element 7*a* of the light receiving section 7, which is developed in the dark box 2*a* of the smoke detecting unit 2.

In this embodiment, a light receiving window 7*b* as an aperture restricted in its aperture ratio by shielding walls 7*c* is provided at a front portion of the light receiving section 7, and as described above, the condenser lens 11 is provided in front of the light receiving section 7. That is, in this embodiment, the field-of-view range R1 of the light receiving element 7*a* of the light receiving section 7 is determined by the light receiving element 7*a*, the light receiving window 7*b*, the condenser lens 11, and the like.

Note that, in this embodiment, the condenser lens 11 as the light transmissive member is provided in front of the light receiving section 7 at a position spaced apart from the light receiving section 7. Alternatively, the light transmissive member may have no light condensing function, or may be provided to the light receiving section 7 itself (for example, on a front surface thereof) without being spaced apart from the light receiving section 7.

As described above, the test light source 22 of the smoke detector 1 is provided at the position at which the test light emitted from the test light source 22 enters the condenser lens 11 as an example of the light transmissive member, the position being situated outside the field-of-view range R1 of the light receiving element 7*a* of the light receiving section 7.

With such arrangement structure of the smoke detector 1, when the test light source 22 is turned ON to test the light receiving sensitivity of the light receiving element 7*a* of the light receiving section 7, as indicated by, for example, a path TB1 of FIG. 2, the test light emitted from the test light source 22 enters the condenser lens 11 both in a case where the contamination or the like does not occur in the condenser lens 11 and therefore the smoke detector 1 has no abnormality that reduces the light receiving sensitivity of the light receiving element 7*a* of the light receiving section 7, and in a case where the contamination or the like occurs in the condenser lens 11 and therefore the smoke detector 1 has the abnormality that reduces the light receiving sensitivity of the light receiving element 7*a* of the light receiving section 7. However, in the former case where the smoke detector 1 has no abnormality, as indicated by, for example, a path TB2 of FIG. 2, the test light passing through the condenser lens 11 does not enter the light receiving element 7*a* of the light receiving section 7 and is not therefore received by the light receiving element 7*a* due to the arrangement structure in which the test light source 22 is situated outside the field-of-view range R1 of the light receiving element 7*a* of the light receiving section 7. On the other hand, in the latter case where the smoke detector 1 has the abnormality, the test light passing through the condenser lens 11 is scattered due to the contamination or the like in the condenser lens 11 so that scattered light is generated, and as indicated by, for example, a path TB3 of FIG. 2, a part of the scattered light, which is derived from the test light entering the field-of-view range R1 of the light receiving element 7*a* of the light receiving section 7, enters the light receiving element 7*a* of the light receiving section 7 and is therefore received by the light receiving element 7*a*.

That is, in the smoke detector 1 in which the test light source 22 is arranged as described above, when the test light source 22 is turned ON to test the light receiving sensitivity of the light receiving element 7*a* of the light receiving section 7, in the case where the smoke detector 1 has no abnormality that reduces the light receiving sensitivity of the light receiving element 7*a* of the light receiving section 7, the test light emitted from the test light source 22 is hardly received by the light receiving element 7*a* of the light receiving section 7, and in the case where the smoke detector 1 has the abnormality that reduces the light receiving sensitivity of the light receiving element 7*a* of the light receiving section 7, the test light emitted from the test light source 22 is received as the scattered light by the light receiving element 7*a* of the light receiving section 7.

Further, in the smoke detector 1, the control section 9 (specifically, comparator circuit thereof) determines whether or not the light receiving sensitivity of the light receiving element 7*a* of the light receiving section 7 is reduced based on the signal output from the light receiving element 7*a* of the light receiving section 7. As described above, in the case where the smoke detector 1 has no abnormality that reduces the light receiving sensitivity of the light receiving element 7*a* of the light receiving section 7, the test light emitted from the test light source 22 is hardly received by the light receiving element 7*a* of the light receiving section 7, and in the case where the smoke detector 1 has the abnormality that reduces the light receiving sensitivity of the light receiving element 7*a* of the light receiving section 7, the test light emitted from the test light source 22 is received as the scattered light by the light receiving element 7*a* of the light receiving section 7. Accordingly, when the control section 9 determines whether or not the light receiving sensitivity of the light receiving element 7*a* of the light receiving section 7 is reduced, the determination can be performed based on the received light intensity (strength of the signal output from the light receiving element 7*a*), which increases between the normal case where the test light emitted from the test light source 22 is hardly received by the light receiving element 7*a* of the light receiving section 7 and the abnormal case where the test light emitted from the test light source 22 is received by the light receiving element 7*a* of the light receiving section 7, and further based on a large amount of change in received light intensity between the two cases.

Thus, according to the smoke detector 1 of this embodiment, the test light source 22 is provided at the position at which the test light emitted from the test light source 22 enters the condenser lens 11 as an example of the light transmissive member, the position being situated outside the field-of-view range R1 of the light receiving element 7*a* of the light receiving section 7. Accordingly, through the detection of the increase in received light intensity at the light receiving element 7*a* of the light receiving section 7, it is possible to detect that the light receiving sensitivity is reduced due to the abnormality such as the contamination occurring in the condenser lens 11. As a result, as compared to the above-mentioned conventional example, in which the reduction in light receiving sensitivity is detected through the detection of the amount of decrease from the normal received light intensity, the reduction in light receiving sensitivity of the light receiving element 7*a* of the light receiving section 7 can be detected with higher accuracy.

As described above, in the smoke detector 1 of this embodiment, the control section 9 determines whether or not the light receiving sensitivity of the light receiving element 7*a* of the light receiving section 7 is reduced based on the signal output from the light receiving element 7*a* of the light receiving section 7. Specifically, the comparator circuit of the control section 9 compares a threshold value for the test, which is preset based on the strength of the signal output from the light receiving element 7*a* of the light receiving section 7 in the normal case where the contamination or the like does not occur in the condenser lens 11 and therefore the smoke detector 1 has no abnormality that reduces the light receiving sensitivity of the light receiving element 7*a* of the light receiving section 7, and the strength of the signal, which is input from the light receiving element 7*a* of the light receiving section 7 to the control section 9 at the time of the test. Further, when it is determined as a result that the contamination or the like occurs in the condenser lens 11 and therefore the smoke detector 1 has the abnormality that reduces the light receiving sensitivity of the light receiving element 7*a* of the light receiving section 7, the control section 9 outputs a signal indicating the abnormality.

Note that, the above-mentioned strength of the signal of the scattered light derived from the test light, which is subjected to the comparison by the control section 9, may include strength of the signal of the whole of the scattered light, which is derived from the test light and received by the light receiving element 7*a* of the light receiving section 7, the signal being output from the light receiving element 7*a*. Further, the above-mentioned threshold value for the test, which is subjected to the comparison by the control section 9, may include a plurality of threshold values which are set in a stepwise manner. Accordingly, it is possible to determine, in a stepwise manner, whether or not the light receiving sensitivity of the light receiving element 7*a* of the light receiving section 7 is reduced. As a result, maintenance of the condenser lens 11 and the like can be performed in a scheduled manner.

Next, referring to FIG. 3, description is given of a flow of processing performed by the smoke detector 1 at the time of testing the light receiving sensitivity of the light receiving element 7*a* of the light receiving section 7. Note that, the series of processing steps is performed by the control section 9.

First, a normal monitoring mode is switched to a test mode (S1), and the test light source 22 is turned ON to emit the test light (S2). Based on the signal output from the light receiving element 7*a* of the light receiving section 7, the strength of the signal (received light intensity) is compared to the preset threshold value for the test, and it is determined whether or not the strength of the signal is equal to or higher than the threshold value (S3). In the case where the contamination or the like occurs in the condenser lens 11, the strength of the signal output in accordance with the received light intensity of the scattered light, which is derived from the test light and received by the light receiving element 7*a* of the light receiving section 7, is compared to the threshold value for the test. When the strength of the signal output from the light receiving element 7*a* is equal to or higher than the threshold value for the test, it is determined that the contamination or the like occurs in the condenser lens 11 (S4). On the other hand, in the case where the contamination or the like does not occur in the condenser lens 11, the light receiving element 7*a* of the light receiving section 7 does not receive the test light. Even when the strength of the signal output from the light receiving element 7*a* of the light receiving section 7 is compared to the threshold value for the test, the strength of the signal does not become equal to or higher than the threshold value for the test, and it is accordingly determined that the contamination or the like does not occur in the condenser lens 11 (S5). When it is determined that the contamination or the like occurs in the condenser lens 11, a signal indicating abnormality is output (S6), and then the test mode is switched to the normal fire monitoring mode (S8). When it is determined that the contamination or the like does not occur in the condenser lens 11, after a predetermined period of time has elapsed (S7), the test mode is switched to the normal fire monitoring mode (S8).

(Second Embodiment)

Figure 4:
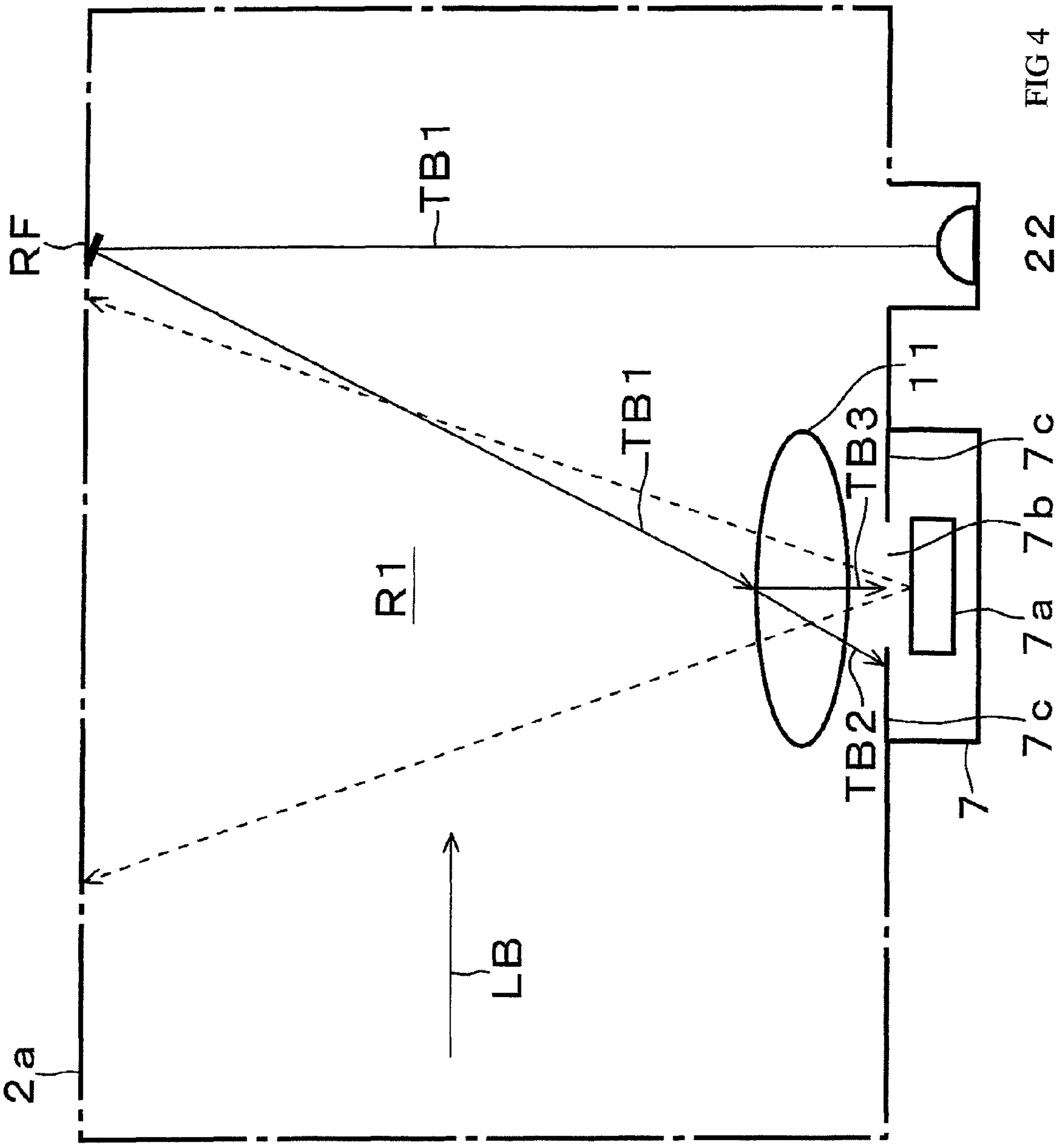
FIG. 4 is a diagram corresponding to FIG. 2 according to a second embodiment of the present invention.

Referring to FIG. 4, a second embodiment of the present invention is described. Note that, instead of the configuration of the first embodiment, in which the test light emitted from the test light source 22 directly enters the condenser lens 11 as an example of the light transmissive member, the second embodiment provides a configuration in which the test light indirectly enters the condenser lens 11.

As described above, in the configuration of the first embodiment, the test light emitted from the test light source 22 directly enters the condenser lens 11, but instead, the test light may indirectly enter the condenser lens 11. The test light emitted from the test light source 22 may enter the condenser lens 11 via a reflection surface.

Specifically, for example, as illustrated in FIG. 4, the following configuration may be provided. The test light source 22 is provided at a position at which the test light emitted from the test light source 22 does not directly enter the condenser lens 11, and the test light is caused to travel outside the field-of-view range R1 of the light receiving element 7*a* of the light receiving section 7. In this state, there is utilized a wall surface of the dark box 2*a* (for example, wall surface of the light trap 14 constituting the light shielding section 13) that functions as a reflection surface RF for reflecting the test light toward the condenser lens 11 (the reflection surface may be provided separately). In this manner, the test light emitted from the test light source 22 indirectly enters the condenser lens 11.

With this configuration, the degree of freedom can be increased in designing the arrangement structure of the test light source 22. For example, as illustrated in FIG. 4, the test light source 22 can be closely juxtaposed to the light receiving section 7, and accordingly electrical components can be housed collectively on one side.

Note that, also in the smoke detector 1 of the second embodiment, though the reflection surface RF is interposed in the path TB3 of the test light, the test light source 22 is still provided at the position at which the test light emitted from the test light source 22 enters the condenser lens 11 as an example of the light transmissive member, the position being situated outside the field-of-view range R1 of the light receiving element 7*a* of the light receiving section 7. Thus, similarly to the smoke detector 1 of the first embodiment, the reduction in light receiving sensitivity of the light receiving element 7*a* of the light receiving section 7 can be detected with high accuracy.

(Third Embodiment)

Figure 5:
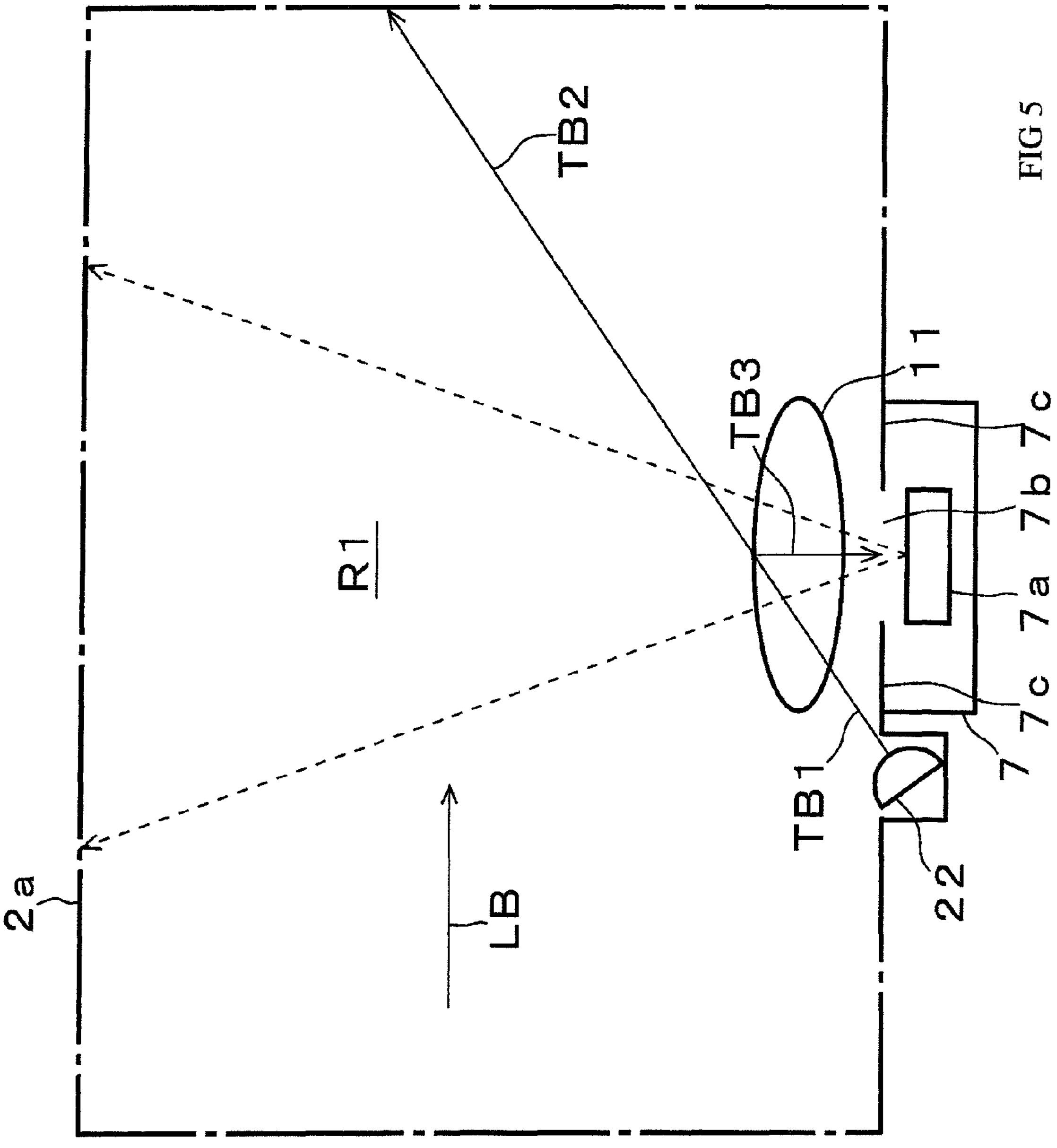
FIG. 5 is a diagram corresponding to FIG. 2 according to a third embodiment of the present invention.

Referring to FIG. 5, a third embodiment of the present invention is described. Note that, the third embodiment provides a configuration in which the test light source 22 is provided on the light receiving section 7 side as seen from the condenser lens 11 so that the test light enters the condenser lens 11 from the light receiving section 7 side to the smoke detecting section 12 side.

When the contamination or the like occurs in the condenser lens 11, as illustrated in FIG. 5, the scattered light traveling along the path TB3 enters the light receiving element 7*a* of the light receiving section 7 similarly to the first and second embodiments.

With this configuration, the test light source 22 can be further closely juxtaposed to the light receiving section 7 as compared to the second embodiment.

(Fourth Embodiment)

Figure 6:
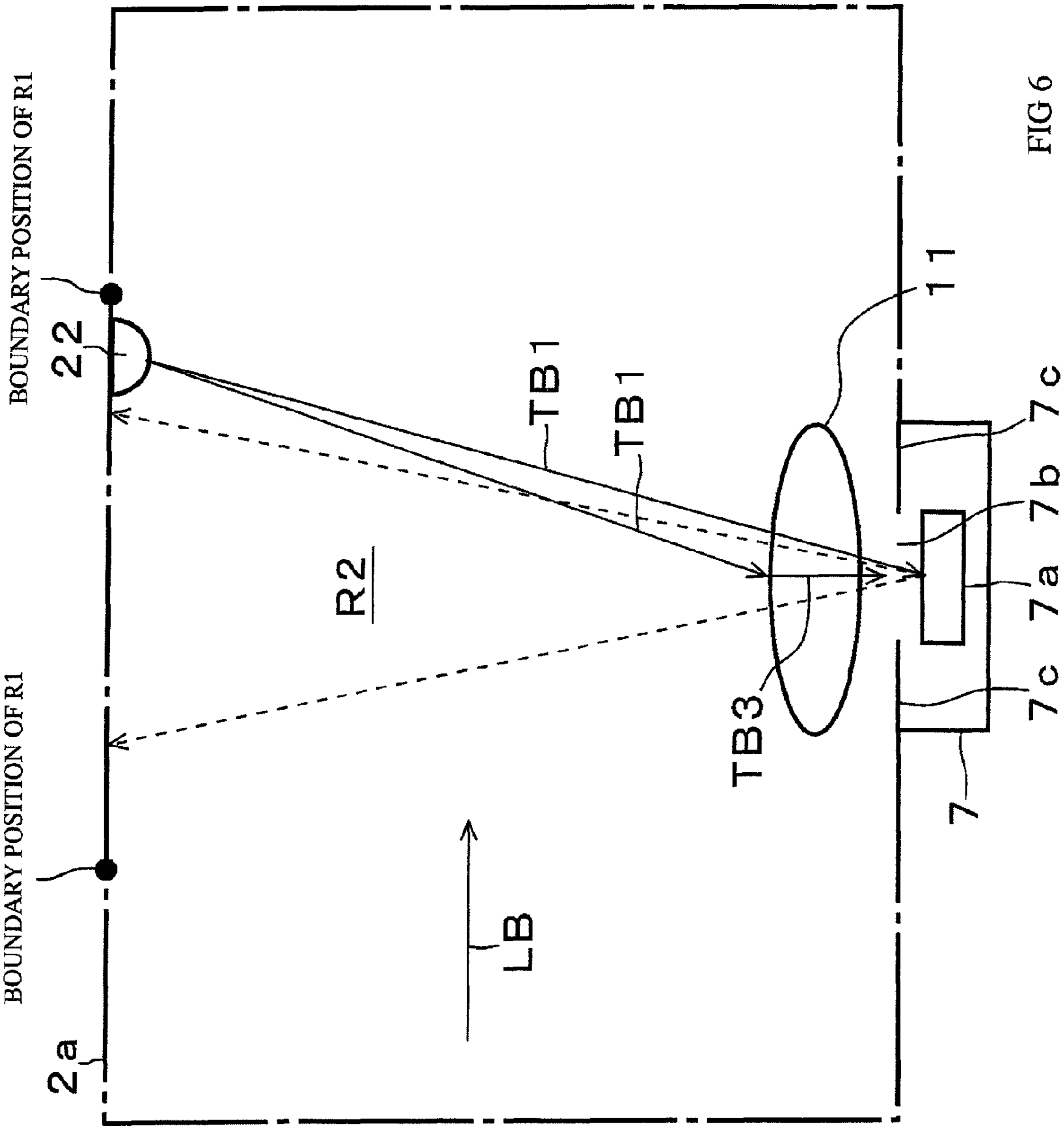
FIG. 6 is a diagram corresponding to FIG. 2 according to a fourth embodiment of the present invention.

Referring to FIG. 6, a fourth embodiment of the present invention is described.

The fourth embodiment provides the following configuration. Instead of providing the test light source 22 at the position outside the field-of-view range R1 of the light receiving element 7*a* of the light receiving section 7, the test light source 22 is provided at a position outside an inner range R2 (range defined by the broken lines) defined within the field-of-view range R1 of the light receiving element 7*a* of the light receiving section 7. In the inner range R2, the received light intensity of the test light, which is emitted from the test light source 22 and is received by the light receiving element 7*a* of the light receiving section 7 in the case where the abnormality such as the contamination does not occur in the condenser lens 11, becomes equal to or larger than a sum of the received light intensity of the test light, which is emitted from the test light source 22 and is received by the light receiving element 7*a* of the light receiving section 7 in a state of non-scattered light in the case where the abnormality such as the contamination occurs in the condenser lens 11, and the received light intensity of the test light, which is emitted from the test light source 22 and is received by the light receiving element 7*a* of the light receiving section 7 in a state of the scattered light in the case where the abnormality such as the contamination occurs in the condenser lens 11.

Also with this configuration, the received light intensity of the test light, which is emitted from the test light source 22 and is received by the light receiving element 7*a* of the light receiving section 7 in the case where the contamination or the like occurs in the condenser lens 11 and therefore the smoke detector 1 has the abnormality that reduces the light receiving sensitivity of the light receiving element 7*a* of the light receiving section 7, can be set higher than the received light intensity of the test light, which is emitted from the test light source 22 and is received by the light receiving element 7*a* of the light receiving section 7 in the case where the contamination or the like does not occur in the condenser lens 11 and therefore the smoke detector 1 has no abnormality that reduces the light receiving sensitivity of the light receiving element 7*a* of the light receiving section 7. Thus, it can be determined whether or not the light receiving sensitivity of the light receiving element 7*a* of the light receiving section 7 is reduced based on the received light intensity at the light receiving element 7*a* of the light receiving section 7, which increases between the case where the abnormality such as the contamination does not occur in the condenser lens 11 and the case where the abnormality such as the contamination occurs in the condenser lens 11.

In this case, the inner range R2 defined within the field-of-view range R1 of the light receiving element 7*a* of the light receiving section 7 may be defined, in other words, as a field-of-view range in which the following relational expression is established:

$$A0 \leq A1 + B1,$$

where (A0) represents the received light intensity of the test light, which is emitted from the test light source 22 and is received by the light receiving element 7*a* of the light receiving section 7 in the case where the abnormality such as the contamination does not occur in the condenser lens 11, (A1) represents the received light intensity of the test light, which is emitted from the test light source 22 and is received by the light receiving element 7*a* of the light receiving section 7 in the state of the non-scattered light in the case where the abnormality such as the contamination occurs in the condenser lens 11, and (B1) represents the received light intensity of the test light, which is emitted from the test light source 22 and is received by the light receiving element 7*a* of the light receiving section 7 in the state of the scattered light in the case where the abnormality such as the contamination occurs in the condenser lens 11.

Specifically, the received light intensity (A0) of the test light, which is emitted from the test light source 22 and is received by the light receiving element 7*a* of the light receiving section 7 in the case where the abnormality such as the contamination does not occur in the condenser lens 11, becomes largest when the test light source 22 is provided immediately at the front of the light receiving element 7*a* within the field-of-view range R1 of the light receiving element 7*a* of the light receiving section 7, and gradually decreases as the position of the test light source 22 shifts in a lateral direction (at the positions of the test light source 22 according to the first to third embodiments, the received light intensity (A0) is zero, and a boundary position of the field-of-view range R1 is a position at which the received light intensity (A0) becomes zero). In the case where the abnormality such as the contamination occurs in the condenser lens 11, as the position of the test light source 22 shifts in the lateral direction, the received light intensity (A1) of the test light, which is emitted from the test light source 22 and is received as the non-scattered light (direct incident light) by the light receiving element 7*a* of the light receiving section 7, gradually decreases, and on the other hand, the received light intensity (B1) of the test light, which is emitted from the test light source 22 and is received as the scattered light by the light receiving element 7*a* of the light receiving section 7, gradually increases. At a given position, the received light intensity (A0) in the case where the abnormality such as the contamination does not occur in the condenser lens 11 becomes equal to the sum of the received light intensity (A1) and the received light intensity (B1) in the case where the abnormality such as the contamination occurs in the condenser lens 11. This position corresponds to a boundary position of the inner range R2. When the position falls within the inner range R2, the above-mentioned relational expression of $A0 \geq A1 + B1$ is established, and when the position is situated out of the boundary position of the inner range R2, that is, when the position falls out of the inner range R2, the sum of the received light intensity (A1) and the received light intensity (B1) in the case where the abnormality such as the contamination occurs in the condenser lens 11 (sum of the received light intensity of the test light, which travels along the path TB1 and directly enters the light receiving element 7*a*, and the received light intensity of the test light, which is scattered at the condenser lens 11 and enters the light receiving element 7*a* along the path TB3) becomes larger than the received light intensity (A0) in the case where the abnormality such as the contamination does not occur in the condenser lens 11 so that a relational expression of $A0 < A1 + B1$ is established. Thus, based on the received light intensity, that is, the signal strength, which increases between the case where the abnormality such as the contamination does not occur in the condenser lens 11 and the case where the abnormality such as the contamination occurs in the condenser lens 11, it can be determined whether or not the light receiving sensitivity of the light receiving element 7*a* of the light receiving section 7 is reduced due to the abnormality such as the contamination occurring in the condenser lens 11.

Note that, even in a case where the received light intensity (B1) of the test light, which is emitted from the test light source 22 and is received as the scattered light by the light receiving element 7*a* of the light receiving section 7, does not change depending on the difference in position of the test light source 22, the received light intensity (A0) in the case where the abnormality such as the contamination does not occur in the condenser lens 11 changes, and hence, even within the field-of-view range R1, there is a position at which the relational expression of A0<A1+B1 is established.

Note that, the abnormality which can be detected in the present invention may conceivably include damage to the condenser lens 11, such as a crack, and entrance of insects as well as the contamination.

What is claimed is:

1. A smoke detector, comprising:

a light emitting section;

a light receiving section; and a smoke detecting section, the light receiving section receiving, via a light transmissive member, scattered light generated when light emitted from the light emitting section is scattered in the smoke detecting section due to particles of smoke or contaminants;

the smoke detector further comprising:

a test light source provided for detecting light receiving sensitivity of the light receiving section, and wherein reduction in the light receiving sensitivity of the light receiving section is detected through detection of an increase in received light intensity of test light, which is emitted from the test light source and is received by the light receiving section, wherein the light receiving section receives scattered light generated when the test light, which is emitted from the test light source and enters the light transmissive member, is scattered in a case where an abnormality caused by contamination, cracks or the entrance of insects occurs in the light transmissive member, and wherein reductions in the light receiving sensitivity of the light receiving section are detected when the received light intensity increases more than the light intensity received under normal conditions without any abnormality caused by receiving scattered light.

2. A smoke detector according to claim 1, wherein the test light source is provided at a position at which the test light emitted from the test light source enters the light transmissive member, the position being situated outside a field-of-view range of the light receiving section.

3. A smoke detector according to claim 1, wherein the test light source is provided at a position at which the test light emitted from the test light source enters the light transmissive member, the position being situated outside an inner range defined within a field-of-view range of the light receiving section, the inner range being defined so that received light intensity of the test light, which is emitted from the test light source and is received by the light receiving section in a case where the abnormality caused by the contamination, the cracks or the entrance of insects does not occur in the light transmissive member, becomes equal to or larger than a sum of received light intensity of the test light, which is emitted from the test light source and is received by the light receiving section in a state of non-scattered light in the case where the abnormality caused by the contamination, the cracks or the entrance of insects occurs in the light transmissive member, and received light intensity of the test light, which is emitted from the test light source and is received by the light receiving section in a state of the scattered light in the case where the abnormality such as the contamination occurs in the light transmissive member.

4. A smoke detector according to claim 1, wherein the test light source is provided at a position at which the test light emitted from the test light source enters the light transmissive member, the position being situated outside an inner range defined within a field-of-view range of the light receiving section, the inner range being defined so that the following relational expression is established:

$$A0 \geq A1 + B1,$$

where "A0" represents received light intensity of the test light, which is emitted from the test light source and is received by the light receiving section in a case where the abnormality caused by the contamination, the cracks or the entrance of insects does not occur in the light transmissive member, "A1" represents received light intensity of the test light, which is emitted from the test light source and is received by the light receiving section in a state of non-scattered light in the case where the abnormality caused by the contamination, the cracks or the entrance of insects occurs in the light transmissive member, and "B1" represents received light intensity of the test light, which is emitted from the test light source and is received by the light receiving section in a state of the scattered light in the case where the abnormality such as the contamination occurs in the light transmissive member.

* * * * *